United States Patent
Yasuoka et al.

[11] Patent Number: 6,125,677
[45] Date of Patent: Oct. 3, 2000

[54] APPARATUS FOR PROCESSING BATTERY CASE CAN, A BATTERY, AND A MANUFACTURING METHOD OF BATTERY

[75] Inventors: Ichiro Yasuoka, Hirakata; Mamoru Iida, Kadoma; Kikuo Senoo, Kobe; Takabumi Fujii, Suita, all of Japan

[73] Assignee: Matsushita Electric Industrial Co., Ltd., Osaka, Japan

[21] Appl. No.: 08/815,298

[22] Filed: Mar. 11, 1997

[30] Foreign Application Priority Data

Mar. 13, 1996 [JP] Japan .................................. 8-055924

[51] Int. Cl.⁷ .................................................. B21D 17/04
[52] U.S. Cl. .............................. 72/110; 72/370.12; 72/106
[58] Field of Search ............................. 72/108, 106, 110, 72/111, 370.12; 413/32

[56] References Cited

U.S. PATENT DOCUMENTS

| | | | |
|---|---|---|---|
| 654,257 | 7/1900 | Hunter | 413/32 |
| 867,472 | 10/1907 | Brenzinger | 413/33 |
| 4,389,867 | 6/1983 | Whitlock | 72/121 |
| 4,437,327 | 3/1984 | Madden | 72/94 |
| 4,655,064 | 4/1987 | Hoback | 72/121 |
| 5,490,867 | 2/1996 | Kozawa et al. | |

FOREIGN PATENT DOCUMENTS

| | | |
|---|---|---|
| 59-123162 | 7/1984 | Japan . |
| 59-139550 | 8/1984 | Japan . |
| 03077725 | 4/1991 | Japan . |
| 06044951 | 2/1994 | Japan . |
| WO 97 07551 | 2/1997 | WIPO . |

*Primary Examiner*—Lowell A. Larson
*Attorney, Agent, or Firm*—Ratner & Prestia

[57] ABSTRACT

To present a processing apparatus capable of forming an annular support portion for mounting a sealing plate on an elliptical battery case can at high precision and high productivity, and a structure of an elliptical battery using an elliptical battery case can.

An elliptical battery case can 10 is rotatably held by a case can support mechanism 13. The battery case can 10 is rotated about its tubular center by a case can rotary mechanism 18. Two groove forming rollers 23, 24 are mounted on an oscillatable roller support lever 28. The roller support lever 28 traces the shape of the outer circumference of the battery case can 10, and oscillates within a plane orthogonal to the tubular center of the battery case can 10, and receives a pressing force from a pressurizing device 29 to press the both groove forming rollers 23, 24 against the outer circumference of the battery case can 10. As a result, an annular groove 50 is formed in the outer circumference of the elliptical battery case can 10, and an annular support portion 40 is formed in the inner circumference.

21 Claims, 6 Drawing Sheets

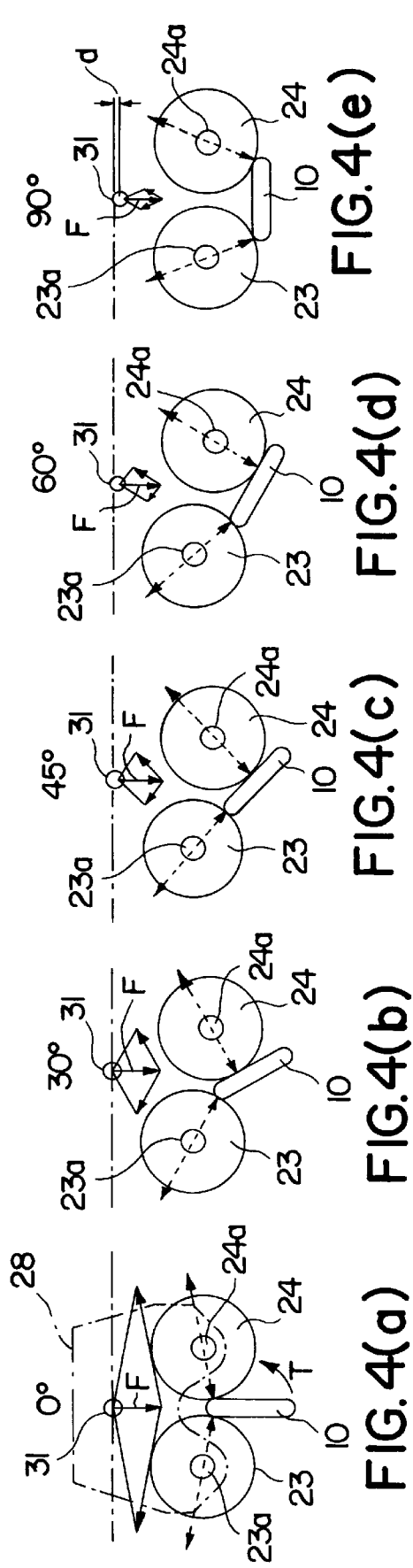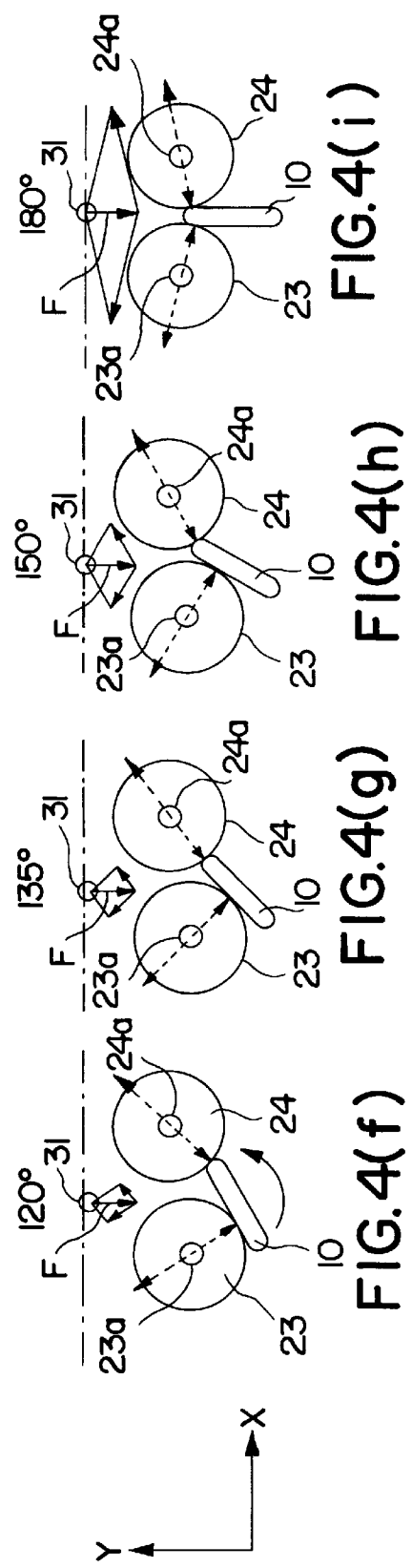

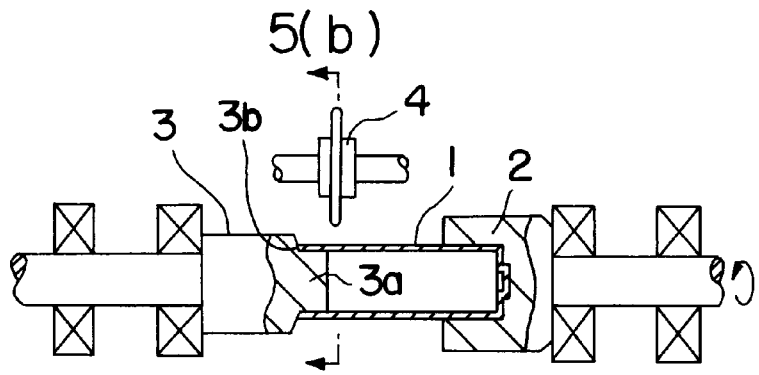
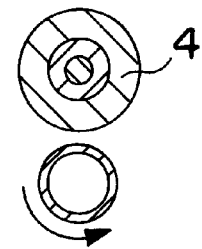
FIG.5(a)
PRIOR ART
FIG.5(b)
PRIOR ART
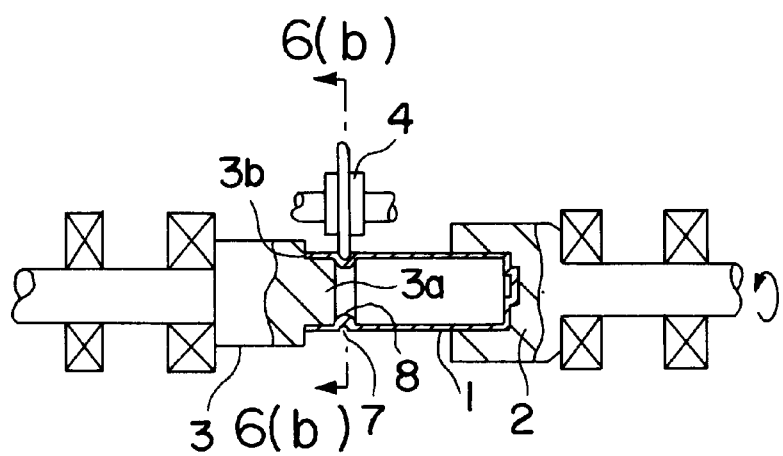
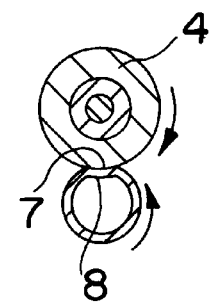
FIG.6(a)
PRIOR ART
FIG.6(b)
PRIOR ART

APPARATUS FOR PROCESSING BATTERY CASE CAN, A BATTERY, AND A MANUFACTURING METHOD OF BATTERY

TECHNICAL FIELD OF THE INVENTION

The present invention relates to an apparatus for processing a battery case can, and more particularly to a processing apparatus for bulging and forming an annular support portion for mounting and supporting a sealing plate for sealing an opening, on the inner circumference of the opening of a battery case can in a tubular form with a bottom, with the cross sectional shape in the orthogonal direction to the tubular center formed in a flat elliptical shape, a structure of an elliptical battery using an elliptical battery case can, and a method for manufacturing a battery.

BACKGROUND OF THE INVENTION

The portable and cordless trend is in a rapid progress recently in various electronic appliances such as audio-video systems and personal computers, and as the driving power sources for them, enclosed type batteries of high energy density and excellent load characteristic are demanded. Conventionally, as the driving power sources of small and thin portable electronic appliances, square cells using square battery case cans with a flat rectangular cross section were mainly used because it was easier to install into the power supply unit of the appliances. In this square cell, a plate group laminating positive and negative pole plates is put in a square battery case can, and the opening is sealed by laser.

Lately, on the other hand, a wide attention is drawn to the lithium battery which is high in voltage and energy density, and long in storage life, among other features. It is, however, difficult to fabricate such lithium battery of flat shape by using the same square battery case can, as the driving power source for small and thin portable electronic appliances. That is, in the lithium battery, the plate group is formed by spirally winding positive and negative plates. Therefore, when putting this plate group into the battery case can of square cross section, the plate group is likely to be deformed due to mismatching of the sectional shapes, and there is also a possibility of current leak when charging and discharging are repeated.

Hence is proposed an elliptical battery in a tubular form with a bottom, using an elliptical battery case can of which cross sectional shape in the orthogonal direction to the tubular center is a flat elliptical shape. This elliptical cell, as compared with the square cell, is easier to process the battery case can, and is capable of preventing deformation of the shape of the spiral plate group contained in the battery case can. Therefore, it has many features, including high reliability and large cell capacity per volume, and it is particularly expected to increase in demand rapidly as the driving power source for small and thin portable electronic appliances.

In the battery, however, after inserting a sealing plate into an opening in the battery case can through an insulating gasket, generally, the opening edge of the battery case can is folded inward to seal. Accordingly, on the inner circumference near the opening of the battery case can, an annular support portion for mounting and supporting the sealing plate is formed, and this annular support portion is formed by the portion bulging to the opposite side of an annular groove by indenting the annular groove along the opening on the outer circumference near the opening in the battery case can. As for this annular support portion, favorable processing methods suited to mass production have been already established in the cylindrical cells and square cells, but effective processing method suited to mass production has not been proposed yet in the elliptical cells.

For example, in the cylindrical cells, the annular support portion is formed by the processing methods shown in FIG. 5 and FIG. 6. In FIG. 5 and FIG. 6, (*a*) is a partially cut-away sectional view, and (*b*) shows sectional views along line A—A and line B—B in (*a*), respectively. As shown in FIG. 5, the bottom portion of a metallic battery case can 1 of a cylindrical form with a bottom is inserted into a case holding portion 2, a protruding portion 3*a* of a case support portion 3 is fitted into the opening of the battery case can 1 to press a step portion 3*b* against the opening side, and the battery case can 1 is pressed from both sides by the case holding portion 2 and case support portion 3 to be fixed, and are also supported rotatably about the tubular center by the case holding portion 2 and case support portion 3 supported rotatably.

The cylindrical battery case can 1 is rotated at a constant speed by force as torque is transmitted from a rotation drive source to the case holding potion 2. In this state, as shown in FIG. 5, a groove forming roller 4 being rotatably supported and opposite at a specific position near the opening on the outer circumference of the battery case can 1 is moved toward the battery case can 1 as shown in FIG. 6. Being pressed to the outer circumference of the groove forming roller 4 at a constant pressure, an annular groove 7 is indented in the outer circumference of the battery case can 1, and an annular support portion 8 is formed by the bulging portion on the opposite side of the annular groove 7 in the inner circumference of the battery case can 1.

In the square cell, as proposed in Japanese Laid-open Patent No. 6-44951, for example, the portion near the opening of the metallic battery case can of square tubular form with a bottom is expanded, and the sealing plate is mounted and supported in the annular support portion composed of a stepped portion formed in this manner.

When forming an annular support portion in the elliptical battery case can, a processing method shown in FIG. 7 may be considered. That is, a elliptical battery case can 10 is rotated in the direction of arrow in FIG. 7 (*a*) while pressing and holding from both sides in the tubular center direction, by the case holding portion and case support portion, same as shown in FIG. 5 and FIG. 6, and a groove forming roller 11 is pressed against to a specified position on the outer circumference of this elliptical battery case can 10. In FIG. 7, the elliptical battery case can 10 located at the reference position (*a*) is rotated by 30°, 40°, 60°, and 90°, respectively, in (*b*) to (*e*). The groove forming roller 11 is always pressed at a constant pressure against the elliptical battery case 10 by a pressurizing device (not shown) such as air cylinder, and a constant pressurizing force F acting on the fulcrum of rotation of a roller shaft 12 of the groove forming roller 11 is shown in a vector diagram in a direction linking the center of the groove forming roller 11 and center of the elliptical battery case can 1, in a length coinciding with the radius of the groove forming roller 11, for the sake of simplicity of drawing.

Therefore, the groove forming roller 11 is, as clear from FIG. 7 (*a*) to (*e*), pressed while rolling against the outer circumference of the elliptical battery case can 10 rotated always at a specified position, and when rotated by 90° by tracing the shape of the outer circumference, it is advanced by distance D toward the battery case can 10. Thereafter, every time the battery case can 10 is rotated by 90°, the groove forming roller 11 is moved reciprocally to move in and out of the battery case 10 in a range of distance D. Thus, the groove forming roller 11 is moved reciprocally in a range of a relatively long distance D to the battery case can 11, and moreover, with respect to the battery case can 10 rotating at a constant speed, the rotational angle of the battery case can 10, that is, the moving speed changes considerably much depending on the contact position of the outer circumference of the battery case can 10. Further, as compared with the pressurizing force "F" acting on the rotation fulcrum of the roller shaft 12 of the groove forming roller 11, the component "W" of the force acting in the orthogonal direction of the pressurizing force "F" due to reaction by the battery case can 10 changes significantly depending on the rotational angle of the battery case can 10, and the direction is inverted every time the rotational angle exceeds 90°.

Accordingly, when the battery case can 10 is rotated at high speed for the purpose of enhancing the productivity, the tracing performance of the groove forming roller 11 to the battery case can 10 is extremely impaired, and the groove forming roller 11 is momentarily spaced from the battery case can 10, and the both members repeat collision, which causes vibration. As a result, the annular groove or the annular support potion cannot be processed at high precision. Therefore, the processing method shown in FIG. 7 cannot be applied in mass production of elliptical cells. If the annular support portion for mounting the sealing plate could be processed in the elliptical battery case can 10 at high precision and high productivity, the elliptical cells having various such excellent features would be mass produced.

It is hence an object of the invention to present a processing apparatus capable of forming the annular support portion for mounting a sealing plate on an elliptical battery case can at high precision and high productivity, and a structure of an elliptical battery using such elliptical battery case can.

SUMMARY OF THE INVENTION

The apparatus for processing a battery case can of the invention is a processing apparatus by indenting an annular groove along an opening, on the outer circumference near the opening of a battery case can of a tubular form with a bottom, having a cross section in the orthogonal direction to the tubular center formed in a flat elliptical shape, for forming an annular support portion for mounting and supporting a sealing plate, in the bulging portion opposite to the annular groove on the inner circumference of the battery case can. This processing apparatus comprises a case can support mechanism for supporting the battery case can rotatably about its tubular center, a case can rotary mechanism for giving a torque in one direction to the case can support mechanism, two groove forming rollers capable of forming the annular groove as being pressed against the outer circumference of the rotating battery case can, a roller support lever for supporting the first groove forming roller and the second groove forming roller rotatably across a specified interval on a same side, and a pressurizing device oscillatably supporting the roller support lever and disposed so as to be free to move in or out of the battery case can in the orthogonal direction, for advancing to press the first groove forming roller and second groove forming roller by a specified pressure to the outer circumference near the opening-of the battery case can. The both groove forming rollers roll and rotate while indenting the outer circumference of the battery case can along with rotation of the battery case can, and the roller support lever traces the shape of the outer circumference of the battery case can, and receives the pressing force of the pressurizing device while oscillating in a plane orthogonal to the tubular center of the battery case can, thereby pressing the both groove forming rollers against the outer circumference of the battery case can.

In this battery case can processing apparatus, since the both groove forming rollers are pressed against the elliptical battery case, the moving distance of the roller support lever moving in and out of the battery case can along with rotation of the battery case can is much shorter than the moving distance in the case of one groove forming roller, and therefore if the battery case can is rotated at high speed, the both groove forming rollers can trace in stable state as being always pressed against the outer circumference of the battery case can. Besides, the reaction forces the both groove forming rollers receive from the battery case can are in mutually opposite directions, and cancel each other, and only a small force close to zero acts on the fulcrum of rotation of the roller support lever, so that the pressurizing force acting on the fulcrum of rotation of the roller support lever hardly changes suddenly against rotation of the battery case can, and excessive force is not applied to the fulcrum of rotation of the roller support lever. Therefore, by the bulging portion on the opposite side by forming the annular groove in the elliptical battery case can, the annular support portion can be processed at high precision and at excellent productivity.

In this constitution, preferably, there are two groove forming rollers, one for processing the groove having a flange in the width corresponding to the width of the annular groove to be formed provided in its periphery, and the other for receiving the load, not having flange, with a circular circumference, and at least one of the two groove forming rollers is used for processing the groove.

According to this constitution, the flange of the groove forming roller for processing the groove rolls and rotates while indenting the outer circumference of the elliptical battery case can, and the groove forming roller for receiving the load holds the elliptical battery case can so that the groove may be formed smoothly by the flange. Hence, the annular groove of high quality is efficiently formed in the outer circumference of the elliptical battery case can, and a favorable annular support portion can be processed at high productivity.

Further in the constitution, the case can support mechanism includes a case can holding portion for fitting the battery case can from its bottom, and a case can support portion having a protrusion fitted into the opening of the case can, and a step for abutting against the opening, and further preferably the battery case can is held by the case can holding portion and the case can support portion, and the case can rotary mechanism transmits the rotation of a single rotation drive source into the case can holding portion and the case can support portion in synchronism.

In this constitution, since the elliptical battery case is provided with a rotary driving force at both sides in the tubular center direction, and when the groove forming rollers are pressed against the battery case can, distortion or deformation can be prevented.

Preferably, in the constitution, the two groove forming rollers are disposed at a pitch larger than the maximum length in the orthogonal direction to the tubular center of the battery case can, and at an interval 1 mm or more smaller than the minimum length in the orthogonal direction to the tubular center of the battery case can in a range not allowing the both groove forming rollers to contact with each other, and the roller shafts of the both groove forming rollers are disposed at positions for forming an isosceles triangle about the fulcrum of the roller support lever.

In this constitution, abnormal large force does not act on the battery case can and both groove forming rollers, and the battery case can rotates smoothly, so that the both groove forming rollers can trace naturally the outer circumference of the battery case can.

The battery of the invention comprises a battery case can, an electrode group disposed in the battery case can, an electrolyte member disposed in the battery case can, a sealing plate disposed at the inner circumference side near an opening of the battery case can, and a reinforcing plate disposed at the lower side of the sealing plate. The battery case can has an annular support portion projecting to the inner circumference side near the opening, the sealing plate is mounted on the annular support portion, the reinforcing plate is a plate body having a contour corresponding to the shape of the inner circumference of the battery case can, and the reinforcing plate is disposed at the lower side of the annular support portion.

In the constitution, preferably, the battery case can has a tubular form with a bottom, and its cross section in the orthogonal direction to the tubular center has a flat elliptical shape.

Further preferably, in the constitution, the reinforcing plate is fixed in the battery case can, and a groove forming roller disposed outside of the battery case can is pressed while using the reinforcing plate as load receiver, thereby forming the annular support portion.

In this elliptical battery, in the process of forming the annular groove, when the groove forming rollers pass while rolling and rotating on the linear portion (flat portion) of the elliptical battery case, the reinforcing plate supports the lower adjacent position of the groove forming position of the battery case can from inward, so that the annular groove and annular support portion of high quality without deformation can be formed. As a result, an elliptical battery free from leakage of electrolyte and deformation of spirally wound plate group is obtained.

The method for manufacturing a battery of the invention comprises (1) a step of fabricating a battery case can in a tubular form with a bottom, being in a flat shape, having an opening, (2) a step of disposing an electrode group in the battery case can, (3) a step of disposing an electrolyte member in the battery case can, (4) a step of forming an annular groove on an outer surface of the battery case can by rotating and moving the battery case can about its tubular center, and pressing two positions on the outer surface side near the opening of the battery case can simultaneously in the inward direction, and, at the same time, forming a projecting annular support portion on an inner surface of the battery case can corresponding to the annular groove, and (5) a step of disposing a sealing member on the annular support portion.

In this method, since the groove and support portion are formed by pressing simultaneously in the inward direction from two positions of the outer surface side of the battery case can, the support portion for mounting the sealing plate on the battery case can can be formed at high precision and high productivity.

Preferably, in this method, the battery case can has a tubular form with a bottom, and the cross section in the orthogonal direction to the tubular center is at least one of elliptical form or nearly quadrangular form.

More preferably, the method further comprises a step of disposing a reinforcing plate, at the inside near the opening of the battery case can, wherein, at step (4), using the reinforcing plate as a load receiver, the outer surface of the battery case can corresponding to the position of the opening side of the reinforcing plate is pressed in the inward direction, and the annular groove is formed on the outer surface of the battery case can, and, at the same time, the projecting support portion is formed on the inner surface of the battery case can.

Also preferably, at step (4), a first groove forming roller and a second groove forming roller are disposed at the outside of the battery case can, the first groove forming roller and the second groove forming roller are disposed across a specific interval on a same side, the first groove forming roller and the second groove forming roller are rotatable by frictional force by pressing, the battery case can rolls and rotates on its tubular center, and this rolling action causes both the first groove forming roller and the second groove forming roller to be pressed to the surface of the battery case can, at least one of the first groove forming roller and the second groove forming roller rotates by the frictional force between at least one of the first groove forming roller and the second groove forming roller and the surface of the battery case can, and the annular groove and annular support portion are sequentially formed by the pressing force of such rotation and simultaneous moving.

Preferably, the minimum interval R of the surface of the first groove forming roller and the surface of the second groove forming roller and the length S of the shortest side wall of the battery case can having a flat shape are in the relation of $$0 < R \leq S-1$$

and the pitch P between the center of the first groove forming roller and the center of the second groove forming roller and the length L of the side wall parallel to the opening, orthogonal to S of the battery case can are in the relation of $$L < P.$$

Preferably, at least one of the first groove forming roller and the second groove forming roller has a flange in the width corresponding to the width of the groove formed in its periphery, and the roller having the flange forms the groove.

Further preferably, the first groove forming roller has a flange in the width corresponding to the width of the groove formed in its periphery, the second groove forming roller has a circular periphery without flange, the first groove forming roller forms the groove, and the second groove forming roller acts as load receiver of pressing force when the first groove forming roller presses the battery case can to form the annular groove.

In any one of the methods above, the effect of forming the support portion for mounting the sealing plate on the battery case can at high precision and high productivity is obtained further outstandingly.

BRIEF DESCRIPTION OF THE DRAWINGS

FIG. 4 is an explanatory diagram of displacement of two groove forming rollers and force acting on a roller support lever, sequentially showing the process until the battery case can is rotated by 180°, in an apparatus for processing a battery case can in an embodiment of the invention.

FIG. 5 shows a conventional processing apparatus for forming an annular groove on the outer circumference of a cylindrical battery case, (a) being a partially cut-away side view of the state before processing a groove, and (b) being a sectional view along line 5b—5b in (a).

FIG. 6 shows the groove processing state by the conventional processing apparatus shown in FIG. 5, (a) being a partially cut-way side view, and (b) being a sectional view along line 6b—6b in (a).

Figure 1:
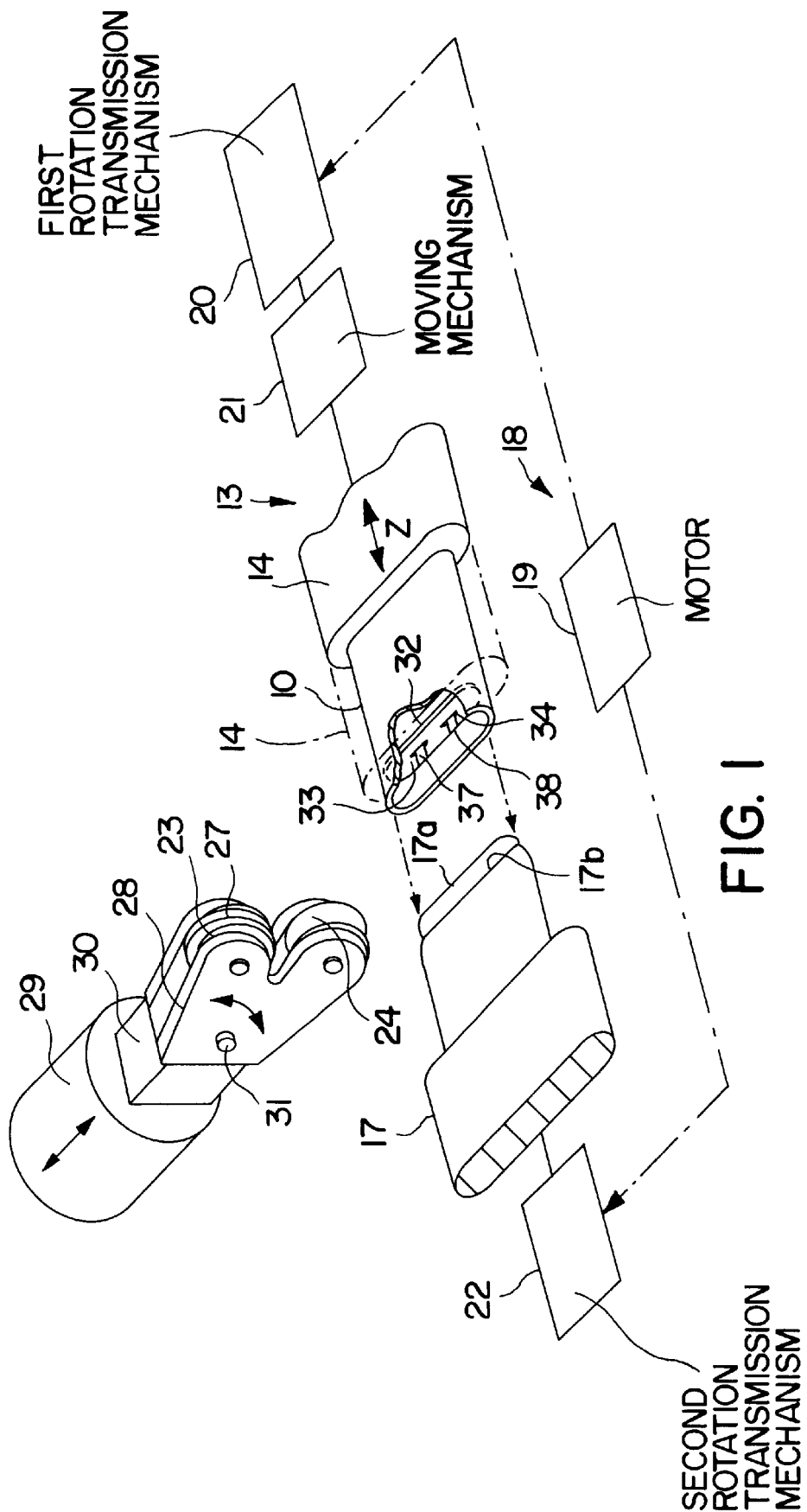
FIG. 1 is a schematic structural diagram showing an apparatus for processing a battery case can in an embodiment of the invention, more particularly a processing apparatus of an annular support portion for mounting a sealing plate on a battery case can.

Reference Numerals
10 Elliptical battery case can
13 Case can support mechanism
14 Case can holding portion
17 Case can support portion
17a Protrusion of case can support portion
17b Step of case can support portion
18 Case can rotary mechanism
19 Motor (rotation driving source)
20 First rotation transmission mechanism
22 Second rotation transmission mechanism
23 Groove forming roller for processing groove (first groove forming roller)
24 Groove forming roller for receiving load (second groove forming roller)
23a First roller shaft
24a Second roller shaft
27 Flange
28 Roller support lever
29 Constant pressurizing device
30 Coupling member
31 Support shaft of roller support lever
32 Reinforcing plate
33 First lead wire lead-out hole
34 Second lead wire lead-out hole
37 Positive lead wire
38 Negative lead wire
40 Annular support portion
42 Sealing plate
50 Annular groove

DESCRIPTION OF THE PREFERRED EMBODIMENTS

Figure 2:
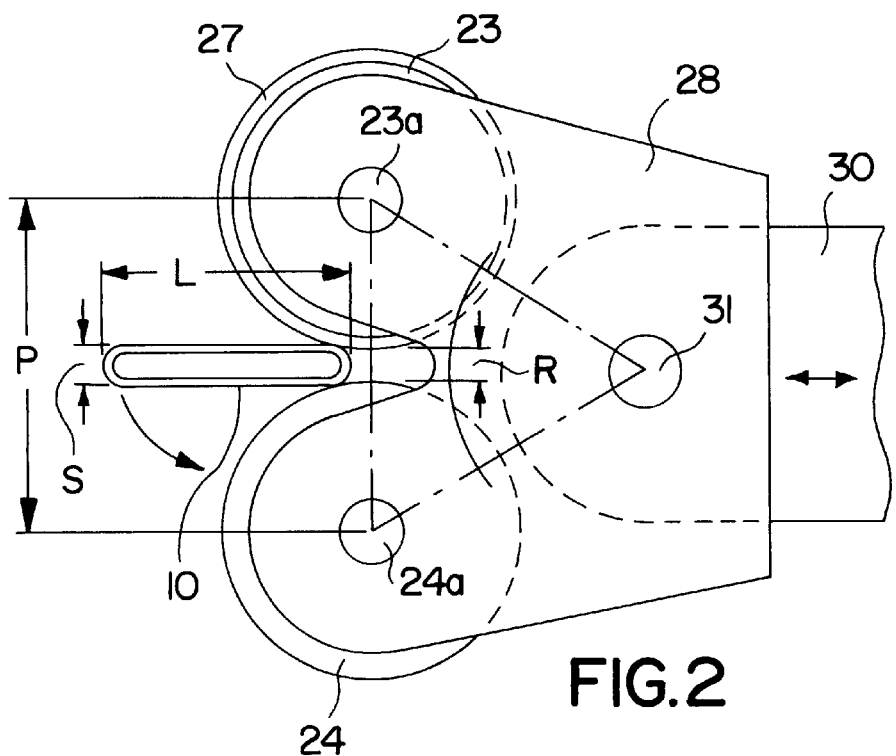
FIG. 2 is an essential side view of the processing apparatus shown in FIG. 1.

Referring now to the drawings, preferred embodiments of the invention are described in detail below. A schematic structural diagram of a processing apparatus of an annular support portion for mounting a sealing plate on an elliptical battery case can in an embodiment of the invention is shown in FIG. 1. A side view of essential parts of this processing apparatus is given in FIG. 2. In FIG. 1 and FIG. 2, an elliptical battery case 10 in a tubular form with a bottom, with the cross section in the orthogonal direction to the tubular center formed in a flat elliptical shape, is fixed as being pressed from both sides in the tubular center direction by a case can support mechanism 13, and is supported rotatably about the tubular center. The case can support mechanism 13 is composed of a case holding portion 14 for holding the elliptical battery case can 10 by inserting from the bottom, and a case support portion 17 having a protrusion 17a fitted into the opening of the battery case can 10 and a step 17b abutting against the opening surface of the battery case can 10.

The case can support mechanism 13 receives torque transmitted from a case can rotary mechanism 18, and rotates and drives the battery case can 10 at a constant speed. This case can rotary mechanism 18 is composed of a first rotation transmission mechanism 20, a moving mechanism 21, and a second rotary transmission mechanism 22. The first rotation transmission mechanism 20 includes a single motor 19 as rotation driving source, a reduction gear for reducing the speed of the motor 19, a spline-processed power transmission shaft for transmitting rotation through the reduction gear, and others. The moving mechanism 21 includes a pulley fitted into the spline shaft so as to be capable of sliding in the spline shaft direction, and others, and moves the case can holding portion 14 in the forward and backward direction to the battery case can 10 indicated by arrow Z, and gives the torque of the rotation transmission mechanism 20 to the case holding portion 14. The second rotation transmission mechanism 22 transmits the torque of the motor 19 to the case support portion 17 through the reduction gear.

Therefore, the case can rotary mechanism 18 is designed to transit the torque of the single motor 19 in synchronism with the case holding portion 14 and case support portion 17. The case holding portion 14 is moved by the moving mechanism 21 from the solid line position to the twin dot chain line, and fits in the battery case can 10 supplied at specified position from its bottom position, and further moves to insert the protrusion 17a of the case support portion 19 into the opening in the battery case can 10, then presses the opening surface of the battery case 10 to the step 17b of the case support portion 17. Afterwards, the torque of the motor 19 is transmitted to the case holding portion 14 and case support portion 17 respectively through the first rotation transmission mechanism 20 and second rotation transmission mechanism 22, so that the battery case can 10 is rotated at a constant speed.

On the other hand, a first groove forming roller 23 and a second groove forming roller 24 are disposed at specified positions. The first groove forming roller 23 and second groove forming roller 24 are pressed against the outer circumference of the battery case can 10 rotated at a constant speed, and thereby an annular groove is formed. The first groove forming roller 23 is for processing the groove having a flange 27 in the width corresponding to the width of the annular groove to be formed on the outer circumference of the battery case can 10 projected on the periphery, and the second groove forming roller 24 is for receiving the load in a circular section without flange 27. The first groove forming roller 23 and second groove forming roller 24 are rotatably attached to a bifurcate roller support lever 28. Alternatively, the first groove forming roller 23 and second groove forming roller 24 may be both used for processing the groove.

The first groove forming roller 23 and second groove forming roller 24 are attached to the roller support lever 28, with a first roller shaft 23a and a second roller shaft 24a disposed at positions for forming an isosceles triangle indicated by twin dot chain line in the center of a support shaft 31 of the roller support lever 28. The individual centers of the both groove forming rollers 23, 24 are disposed at pitch "P" larger than the maximum length "L" in the orthogonal direction to the tubular center of the battery case can 10, and at interval "R" 1 mm or more smaller (preferably 2 mm or more smaller) than the minimum dimension "S" in the orthogonal direction to the tubular center of the battery case can 10 in a range not allowing mutual contact of the both groove forming rollers 23, 24. The roller support lever 28 is installed oscillatably about the support shaft 31 through a coupling member 30 in a constant pressurizing device 29 such as air cylinder. That is, the following relation is preferred.

$$0 < R \leq S - 1$$

By using this processing apparatus, when forming an annular groove on the outer circumference of the elliptical battery case can 10 and when forming an annular support portion on the inner circumference, as shown in FIG. 1, the reinforcing plate 32 is fitted into the battery case can 10 from the opening, and is positioned and fixed at the portion closer to the bottom from the position for forming the annular support portion. This reinforcing plate 32 has a first lead wire lead-out hole 33 and a second lead wire lead-out hole 34 for inserting a positive lead wire 37 and a negative lead wire 38, respectively into a single plate body having the contour corresponding to the inner circumference of the battery case can 10.

Figure 3A:
FIG. 3 shows a structure of an elliptical battery in an embodiment of the invention, (a) being a plane view, (b) being a partially cut-away front view, and (c) being a side view.
Figure 3B:
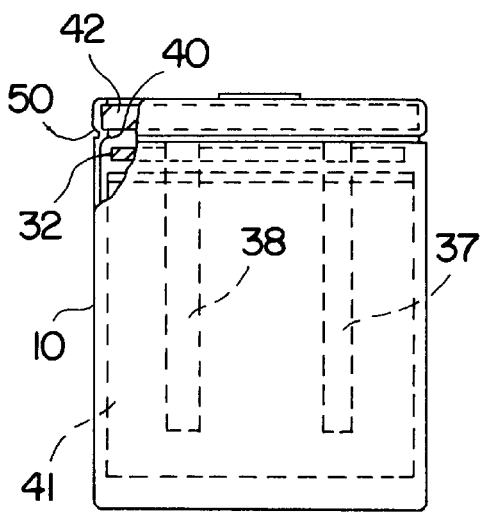
Figure 3C:
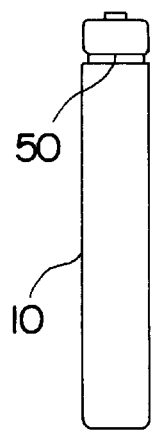
Figure 7A:
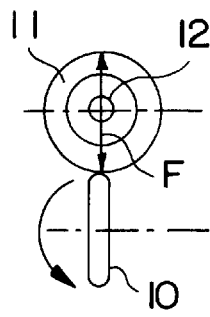
FIG. 7 is an explanatory diagram of displacement of groove forming roller and force acting on a roller support lever, in a conventional processing apparatus of annular support portion for mounting a sealing plate on an elliptical battery case can.
Figure 7B:
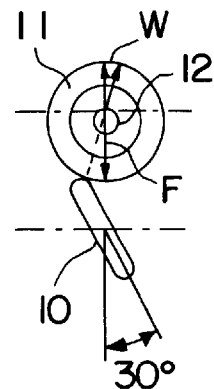
Figure 7C:
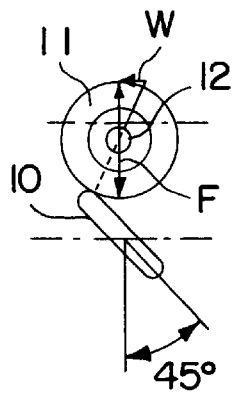
Figure 7D:
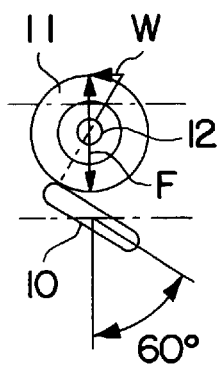
Figure 7E:
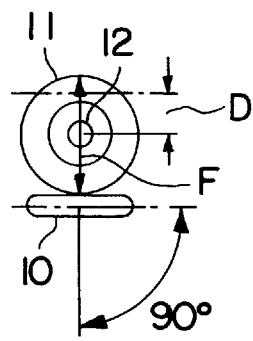
Figure 8A:
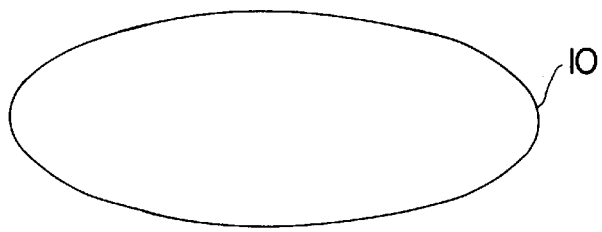
FIG. 8(a) is a cross sectional view of an elliptical battery case can.
Figure 8D:
FIG. 8(d) is a cross sectional view of a neatly slender quadrangular battery case can.
Figure 8B:
FIG. 8(b) is a cross sectional view of a flat elliptical battery case can.

Therefore, the elliptical battery manufactured by this processing apparatus by forming the annular groove and annular support portion has the same structure as shown in FIG. 3. FIG. 3 (a) is a plan view of the elliptical battery, (b) is a partially cut-away front view, and (c) is a side view.

In FIG. 3, the battery case can 10 has a tubular shape with a bottom having an opening, and its cross section in the orthogonal direction to the tubular center is a flat elliptical shape or a nearly quadrangular shape having confronting parallel planes. On the inner circumference near the opening, an annular support portion 40 projecting in the inward direction is formed. A sealing plate 42 is disposed on the annular support portion 40. A plate group 41 is disposed on the battery case can 10. At the bottom side position near the annular support portion 40 at the inner circumference side of the battery case can 10, the reinforcing plate 32 is fitted in and fixed. The reinforcing plate 32 is an integral plate body having a contour corresponding to the inner circumference of the battery case can 10. At specified positions of the reinforcing plate 32, the first lead wire lead-out hole 33 and the second lead wire lead-out hole 34 are formed. The annular support portion 40 is formed in the portion bulging to the opposite side of an annular groove 50 by forming the annular groove 50 by the processing apparatus on the outer circumference of the battery case can 10.

In the case of forming the annular support portion 40 in the elliptical battery case can 10 by the processing apparatus, the displacement of the first groove forming roller 23 and second groove forming roller 24, and the magnitude and direction of the force acting on the support shaft 31 of the roller support lever 28 are described below by referring to FIG. 4. In FIG. 4, for the ease of understanding by simplifying the explanation, the constitution is slightly different from that in FIG. 1 and FIG. 2. That is, in FIG. 4, flat rollers of same shape without flange 27 are shown as the first groove forming roller 23 and second groove forming roller 24, and only a pressurizing force acts on the both groove forming rollers 23, 24 pressed against the battery case can 10, an frictional force does not work, and it is assumed and illustrated that the battery case can 10 is not deformed by the pressing force of the both groove forming rollers 23, 24.

In FIG. 4, the elliptical battery case can 10 at the reference position (a) is rotated by 30°, 45°, 60°, 90°, 120°, 135°, 150°, and 180° as shown in (b) to (i). The steps of rotation from 180 to 360° is same as in the process from 0 to 180° shown in (a) to (i), and the illustration is omitted. The both groove forming rollers 23, 24 are always pressed with a constant pressure against the elliptical battery case 10 through the roller support lever 28 by the constant pressurizing device 29, and the constant pressurizing force "F" acting on the center of the support shaft 31 of the roller support lever 28 is shown in a vector diagram. The reaction forces that the both groove forming rollers 23, 24 receive from the battery case can 10 are in the directions passing through each contact point from the tubular center of the battery case can 10 as indicated by broken line arrows, and the sum of the reaction forces acting on the groove forming rollers 23, 24 is balanced with the pressurizing force "F", and hence the reaction forces acting on the groove forming rollers 23, 24 are shown in the vector diagram together with the pressurizing force "F".

This processing apparatus forms the annular groove 50 by using the two groove forming rollers 23, 24 disposed as shown in FIG. 2. The both groove forming rollers 23, 24 roll and rotate while indenting the outer circumference, along with rotation of the battery case can 10 at a constant speed in the direction of arrow "T" as shown in FIG. 4 (a) to (i), and the roller support lever 28 traces the shape of the outer circumference of the battery case can 10, and receives the pressurizing force of the constant pressurizing device 29, while oscillating within a plane orthogonal to the tubular center of the battery case can 10, and presses the both groove forming rollers 23, 24 at a constant pressure to the outer circumference of the battery case 10.

Herein, in this processing apparatus, since the two groove forming rollers 23, 24 are both pressed against the outer circumference of the battery case can 10, as clear from comparison between FIG. 4 and FIG. 7, the moving distance "d" of the roller support lever 28 in the advancing and retreating direction (Y direction in FIG. 4) of the support shaft 31 along with rotation of the battery case can 10 is much shorter than the moving distance "D" in the case of using one groove forming roller 4 in the prior art shown in FIG. 7. Accordingly, if the battery case can 10 is rotated at high speed, the both groove forming rollers 23, 24 can trace in stable state always being pressed against the outer circumference of the battery case can 10.

Moreover, the reaction forces the both groove forming rollers 23, 24 receive from the battery case can 10 (the components of the force in direction "X" in FIG. 4) are in mutually opposite directions, and cancel each other to be very small or nearly zero, and act on the fulcrum of rotation (center of support shaft 31) of the roller support lever 28. That is, by the reaction forces the both groove forming rollers 23, 24 receive, the generated moments of rotation are balanced to be nearly zero, and therefore the pressurizing force acting on the fulcrum of rotation of the roller support lever 28 hardly changes suddenly against the rotation of the battery case can 10, and hence excessive force is not applied to the fulcrum of rotation of the roller support lever 28. From this respect, too, the tracing performance of the both groove forming rollers 23, 24 to the shape of the battery case can 10 is further enhanced, and the processing precision and productivity of the annular groove 50 are further enhanced.

In addition, the direction of reaction forces the both groove forming rollers 23, 24 receive from the battery case can 10 is not inverted in spite of the rotational angle of the battery case can 10. Therefore, it is possible to form the annular groove 50 and annular support portion 40 at high quality while rotating the battery case can 10 at high speed.

Prior to forming of the annular support portion 40, the reinforcing plate 32 is fitted and fixed to the battery case can 10 as described above. Therefore, in the process of pressing the groove forming rollers 23, 24 against the linear portion of the battery case can 10, the reinforcing plate 32 supports the neighboring position beneath the position pressed by the groove forming rollers 23, 24 in the flat portion of the battery case can 10 so as not to be indented inward. Accordingly, the annular groove 50 being formed is in a specified shape having a specified width, without being deviated from the specified forming position. By contrast, without reinforcing plate 32, in the linear portion of the battery case can 10, since the supporting force from inward is insufficient, the annular groove 50 cannot be formed smoothly. Hence, the annular groove is deviated in the bottom direction from the specified forming position, and is formed in a dull drooped shape, and as a result it may lead to troubles such as leakage of electrolyte. Incidentally, the reinforcing plate 32 was also used conventionally for the purpose of preventing swelling of the battery case can in the event of gas generation, but the conventional reinforcing plate was divided into three sections, and lacked the auxiliary function for forming the annular groove 50 smoothly.

In the case of increasing the interval "R" of the first groove forming roller 23 and second groove forming roller 24 to be close to the minimum dimension "S" of the battery case can 10, in particular, in the processing steps in FIG. 4 (a), (e), (i), the intersecting angle of the extension lines of the contact points of the both groove forming rollers 23, 24 and battery case can 10 is a very sharp acute angle, and an abnormally large force acts on the battery case can 10 and both groove forming rollers 23, 24, resulting in unfavorable phenomena. It is therefore necessary not to set the pitch "P" between the centers of the groove forming rollers 23, 24 too large. The interval "R" of the first groove forming roller 23 and second groove forming roller 24 is set smaller than the minimum dimension "S" of the battery case can 10 by 1 mm or more, preferably 2 mm or more, in a range not allowing mutual contact between the first groove forming roller 23 and second groove forming roller 24.

In the above embodiment, the torque of a single motor 19 is transmitted in synchronism to the case can holding portion 14 and case can support portion 17 of the case can support mechanism. Accordingly, if the torque is transmitted to either one of the case can holding portion 14 and case can support portion 17, distortion of the battery case can 10 or other inconvenience may be prevented. Still more, the processing precision of the annular groove 50 is enhanced, and shortening of the life of the both groove forming rollers 23, 24 can be prevented.

In the elliptical battery in the embodiment of the invention manufactured by processing the annular support portion 40 by the above processing apparatus, as shown in FIG. 3 (a) to (c), the reinforcing plate 32 is fitted into the position near the bottom close to the annular support portion 40 in the elliptical battery case can 10, and is fixed by welding.

Therefore, when processing the annular groove 40 by the both groove forming rollers 23, 24, the battery case can 10 can be supported from inside by the reinforcing plate 32, and therefore the annular groove 50 of specified shape can be securely formed in the specified position. It is hence possible to prevent adverse effects such as leakage of electrolyte due to formation of deformed annular support portion 40 or deformation of the plate group 41 accommodated inside. The positive lead wire 37 passing through the first lead wire lead-out hole 33 of the reinforcing plate 32 is welded and connected to the sealing plate 42, the negative lead wire 38 passing through the second lead wire lead-out hole 34 is welded and connected to the reinforcing plate 32, the sealing plate 42 is put and supported on the annular support portion 40, and the opening edge of the battery case can 10 is folded inward by crimping. In the crimping process, the annular groove 50 is fitted to the support member, and the battery case can 10 is held. Thus, elliptical battery is fabricated.

Next is described the outline of an embodiment of forming process of the annular groove 50 on the outer circumference of the elliptical battery can case 10 by using the processing apparatus of the invention. The workpiece, the elliptical battery case can 10, was fabricated by using a 0.4 mm thick stainless steel plate or nickel plated steel plate, in a shape of maximum dimension (width) "L" in the orthogonal direction to the tubular center of 40 mm, minimum dimension (thickness) "S" of 8 mm, and depth of 49 mm. The reinforcing plate 32 is a 1.6 mm thick stainless steel plate, and the first lead wire lead-out hole 33 and second lead wire lead-out hole 34 were formed by piercing. In the elliptical battery case can 10, a plate group 41 winding the positive electrode and negative electrode flatly and spirally through a separator was accommodated. Then the reinforcing plate 32 was inserted into specified position of the battery case can 10, and fixed by welding.

In succession, forming the annular groove 50 on the outer circumference of the battery case can 10 by the above processing apparatus, the annular support portion 40 was provided on the inner circumference. As the first groove forming roller 23 and second groove forming roller 24 of this processing apparatus, as shown in FIG. 1 and FIG. 2, the first groove forming roller 23 was provided with flange 27 and used for groove processing, and the second groove forming roller 24 was for receiving load without flange 27. The material for the both groove forming rollers 23, 24 was SKD material or SKH material, and this material was heat treated for hardening the surface, and was coated further with TiN.

The torque of the motor 19 was transmitted in synchronism to the case can holding portion 14 and case can support portion 17 through a reduction gear of $\frac{1}{22}$, and the battery case can 10 was rotated and driven at a rotating speed of 80 rpm. As the constant pressurizing device 29, an air cylinder was used, and the both groove forming rollers 23, 24 were pressed against the battery case can 10 at a constant pressurizing forced of 300 kgf. In this case, the net time required for processing of the annular groove 50 was about 4 seconds, and the annular support portion 40 bulging to the opposite side of the annular groove 50 was formed in a shape without any particular deformation. That is, by using the processing apparatus of the invention, the annular support portion 40 by the annular groove 50 of high quality could be processed on the elliptical battery case can 10 at an extremely high productivity.

The invention is not limited to the above embodiments and examples alone, but may be modified in various forms. For example, in the foregoing embodiments, only one roller support lever 28 comprising both groove forming rollers 23, 24 was used, but it is also possible to incorporate another roller support lever at a symmetrical position to the tubular center of the battery case can 10 so as to process the groove by using two roller support levers. In this constitution, the groove processing time can be shortened, and the force acting on the case can support mechanism 13 can be balanced, so that the processing precision can be enhanced.

The battery case can has the shape so that a cross section in the orthogonal direction to the tubular center of the battery case is an elliptical form, a flat elliptical form, a nearly quadrangular form or a nearly slender quadrangular form as shown in FIGS. 8(*a*)–8(*d*), respectively.

Figure 9A:
FIG. 9(a) is a cross sectional view of a slender quadrangular reinforcing plate.
Figure 8C:
FIG. 8(c) is a cross sectional view of a nearly quadrangular battery case can.
Figure 9B:
FIG. 9(b) is a cross sectional view of a slender elliptical reinforcing plate.

When the battery case can has the shape so that a cross section in the orthogonal direction to the tubular center of the battery case is a flat elliptical form as shown in FIG. 8(*b*), the reinforcing plate has a slender quadrangular shape in an outer shape corresponding to a flat portion of the flat elliptical form of the inner circumference of said battery case as shown in FIG. 9(*a*), or the reinforcing plate has a slender elliptical shape in an outer shape corresponding to the inner circumference of said battery case as shown in FIG. 9(*b*).

According to the battery case processing apparatus of the invention, an annular groove is formed by pressing two groove forming rollers against an elliptical battery case, and an annular support portion is formed by an portion bulging to the opposite side of the annular groove. In this constitution, the moving distance of the roller support lever accompanying rotation of the battery case can is markedly shortened, and the reaction forces the both groove forming rollers receive from the battery case can cancel each other, and hence the pressurizing force acting on the fulcrum of rotation of the roller support lever does not change suddenly against the rotation of the battery case can, and excessive force is not applied to the fulcrum of rotation of the roller support lever. Therefore, the two groove forming rollers can trace the outer circumference of the elliptical battery case can rotating at high speed in a stable state being always pressed thereto. As a result, the annular support portion can be processed in the elliptical battery case can at high precision and excellent productivity, and the elliptical batteries having various excellent features can be mass produced.

Moreover, by forming a groove forming roller for processing the groove having a flange in a width corresponding to the width of the annular groove to be formed, in at least one of the two groove forming rollers, an annular groove of high quality can be efficiently formed on the outer circumference of the elliptical battery case can, and a favorable annular support portion can be processed at high productivity. Still more in the constitution of transmitting the torque of a single rotation drive source to both sides in the tubular center direction of the elliptical battery case can in synchronism, distortion or deformation of the battery case can may be prevented. In addition, in the constitution of disposing two groove forming rollers at a pitch larger than the maximum length in the orthogonal direction to the tubular center of the battery case can, and at an interval smaller than 1 mm or more than the minimum dimension in the orthogonal direction to the tubular center of the battery case can in a range not allowing mutual contact of both groove forming rollers, abnormal large force does not act on the battery case can and both groove forming rollers, and the battery case can may rotate smoothly, and the both groove forming rollers can trace the outer circumference of the battery case naturally.

Further according to the constitution of the elliptical battery of the invention, a reinforcing plate made of a plate body having a contour corresponding to the inner circumference of the elliptical battery case is fitted and fixed into a position near the bottom close to the annular support portion in the battery case can, and this reinforcing plate supports battery case can from inward when forming the annular support portion, and therefore the annular groove and annular support portion of high quality without deformation can be formed, so that the elliptical battery free from leakage of electrolyte and deformation of spirally wound plate group may be obtained.

What is claimed:

1. An apparatus for processing an elliptical tubular battery case, said battery case having a tubular form with a bottom, said apparatus comprising:

a case support mechanism for supporting said battery case rotatably about a tubular center of said battery case, a case rotary mechanism for providing torque to said case support mechanism so that said battery case rotates, a groove forming roller having a forming flange, said groove forming roller for a) rolling and rotating on an outer circumference of said battery case near an opening of said rotating battery case and b) forming an annular groove in said battery case by pressing against said outer circumference of said rotating battery case, a further roller having a support surface, wherein said annular groove forms an annular support in an inner circumference of said battery case near said opening of said battery case, wherein at least one of said groove forming roller and said further roller moves while rolling, rotating and indenting the outer circumference to form said annular groove, wherein said groove forming roller and said further roller both move about a further axis, and wherein a first axis of rotation of said groove forming roller, a second axis of rotation of said further roller, and said further axis are located at the corners of an isoceles triangle.

2. An apparatus for processing a battery case according to claim 1, wherein said groove forming roller and said further roller rotate within a casing, said casing subjected to constant pressure towards said battery case as said battery case is processed.

3. An apparatus for processing a battery case according to claim 1, wherein said further axis is situated to one side of axes of rotation of both of said rollers.

4. An apparatus for processing an elliptical tubular battery case, said battery case having a tubular form with a bottom, said apparatus comprising:

a case support mechanism for supporting said battery case rotatably about a tubular center of said battery case, a case rotary mechanism for providing torque to said case support mechanism so that said battery case rotates, a groove forming roller having a forming flange, said groove forming roller for a) rolling and rotating an outer circumference of said battery case near an opening of said rotating battery case and b) forming an annular groove in said battery case by pressing against said outer circumference of said rotating battery case, a further roller having a support surface, a roller support lever for supporting said groove forming roller and said further roller rotatably and maintaining a predetermined distance between said groove forming roller and said further roller, a pressurizing device oscillatably supporting said roller support lever and disposed so as to be free to move one of in and out of said battery case in the orthogonal direction, for pressing said groove forming roller and further roller with a predetermined pressing force against said outer circumference near said opening of said battery case, wherein said annular groove forms an annular support in an inner circumference of said battery case near said opening of said battery case, wherein said groove forming roller and said further roller both move about a further axis, wherein said roller support lever traces a shape of said outer circumference of said battery case, and receives the pressing force of said pressurizing device while oscillating in a plane orthogonal to said tubular center of said battery case, thereby pressing at least one of said groove forming roller and said further roller against said outer circumference of said battery and wherein a first axis of rotation of said groove forming roller, a second axis of rotation of said further roller, and said further axis are located at the corners of an isoceles triangle.

5. The apparatus of claim 4, wherein at least one of said groove forming roller and said further roller has a flange with a width corresponding to a width of said annular groove formed in its periphery, and said at least one of said groove forming roller and said further roller having said flange forms said annular groove.

6. The apparatus of claim 4, wherein said groove forming roller has a flange with a width corresponding to a width of said annular groove formed in its periphery, said further roller has a circular periphery, said further roller forms said annular groove, and said further roller acts as a load receiver of said pressing force when said groove forming roller presses said battery case to form said annular groove.

7. The apparatus of claim 4, wherein said case support mechanism includes:

a case holding portion for fitting said battery case from said bottom, and a case support portion having a protrusion fitted into said opening of said battery case, and a step for abutting against said opening, wherein said battery case is held by said case holding portion and said case support portion, and said case rotary mechanism synchronously transmits the rotation of a single rotation drive source into said case holding portion and said case support portion.

8. The apparatus of claim 4, wherein a surface of said groove forming roller and a surface of said further roller are disposed at a distance in a range from greater than zero to a length 1 mm or less than a length of the minimum side wall in the orthogonal direction to said tubular center of said battery case, a center of said groove forming roller and a center of said further roller are disposed at a pitch larger than a length of a maximum side wall in the orthogonal direction to said tubular center of said battery case, and said groove forming roller and said further roller are disposed at respective positions for forming an isosceles triangle about a fulcrum of said roller support lever.

9. The apparatus of claim 4, wherein said groove forming roller has a disk shape rotatable by a frictional force, said further roller has a disk shape rotatable by said frictional force, both said groove forming roller and said further roller press said outer circumference of said battery case and follow the rolling motion of said battery case, at least one of said groove forming roller and said further roller rotate by the frictional force, and said annular groove and said annular support portion are formed by said pressing force and said rotation.

10. The apparatus of claim 4, wherein a reinforcing plate is disposed at an inner circumferential side near said opening of said battery case, and said annular groove and said support portion are formed by pressing said groove forming roller and said further roller, from outside of said battery case, by using said reinforcing plate as a load receiver.

11. The apparatus of claim 10, wherein said reinforcing plate has an outer shape corresponding to the shape of said inner circumference of said battery case.

12. The apparatus of claim 10, wherein a cross section in the orthogonal direction to said tubular center of said battery case is a flat elliptical form, and said reinforcing plate as a slender quadrangular shape having an outer shape corresponding to flat portion of said flat elliptical form of said inner circumference of said battery case.

13. The apparatus of claim 4, wherein a minimum interval 'R' of a surface of said groove forming roller and a surface of said further groove forming roller and a length 'S' of a shortest side wall of said battery case having a flat shape are in the relation of $$0 < R \leq S - 1$$

and a pitch 'P' between a center of said groove forming roller and a center of said further groove forming roller and a length 'L' of a side wall parallel to said opening, orthogonal to 'S' of said battery case are in the relation of $$L < P.$$

14. The apparatus of claim 3 wherein said pressurizing device includes an air cylinder, and wherein said battery case is pressed by a pressing force of said air cylinder.

15. An apparatus for processing a battery case according to claim 4, wherein said further axis is situated to one side of axes of rotation of both of said rollers.

16. An apparatus for processing an elliptical tubular battery case, said battery case having a tubular form with a bottom, said apparatus comprising:

a case support mechanism for supporting said battery case rotatably about a tubular center of said battery case, a case rotary mechanism for providing torque to said case support mechanism so that said battery case rotates, a groove forming roller having a forming flange, said groove forming roller for a) rolling and rotating an outer circumference of said battery case near an opening of said rotating battery case and b) forming an annular groove in said battery case by pressing against said outer circumference of said rotating battery case, a further roller having a support surface, and a roller support lever for supporting said groove forming roller and said further roller rotatably and maintaining a predetermined distance between said groove forming roller and said further roller, wherein said annular groove forms an annular support in an inner circumference of said battery case near said opening of said battery case, wherein said groove forming roller and said further roller both move about a further axis, wherein a distance between a support shaft of said roller support lever and a roller shaft is longer than a radius of each of said groove forming roller and said further roller, and wherein a first axis of rotation of said groove forming roller, a second axis of rotation of said further roller, and said further axis are located at the corners of an isoceles triangle.

17. An apparatus for processing a battery case according to claim 16, wherein said further axis is situated to one side of axes of rotation of both of said rollers.

18. An apparatus for processing an elliptical tubular battery case, said battery case having a tubular form with a bottom, said apparatus comprising:

a case support mechanism for supporting said battery case rotatably about a tubular center of said battery case, a case rotary mechanism for providing torque to said case support mechanism so that said battery case rotates, a groove forming roller having a forming flange, said groove forming roller for a) rolling and rotating an outer circumference of said battery case near an opening of said rotating battery case and b) forming an annular groove in said battery case by pressing against said outer circumference of said rotating battery case, and a further roller having a support surface, wherein said case support mechanism includes a case holding portion that holds a surrounding of said battery case, wherein said annular groove forms an annular support in an inner circumference of said battery case near said opening of said battery case, wherein said groove forming roller and said further roller both move about a further axis, and wherein a first axis of rotation of said groove forming roller, a second axis of rotation of said further roller, and said further axis are located at the corners of an isoceles triangle.

19. An apparatus for processing a battery case according to claim 18, wherein said further axis is situated to one side of axes of rotation of both of said rollers.

20. An apparatus for processing an elliptical tubular battery case, said battery case having a tubular form with a bottom, said apparatus comprising:

a case support mechanism for supporting said battery case rotatably about a tubular center of said battery case, a case rotary mechanism for providing torque to said case support mechanism so that said battery case rotates, a groove forming roller having a forming flange, said groove forming roller for a) rolling and rotating on an outer circumference of said battery case near an opening of said rotating battery case and b) forming an annular groove in said battery case by pressing against said outer circumference of said rotating battery case, a further roller having a support surface, wherein said annular groove forms an annular support in an inner circumference of said battery case near said opening of said battery case, wherein at least one of said groove forming roller and said further roller moves while rolling, rotating and indenting the outer circumference to form said annular groove, wherein said groove forming roller and said further roller both move about a further axis, only one of said groove forming roller and said further roller having a flange, and wherein a first axis of rotation of said groove forming roller, a second axis of rotation of said further roller, and said further axis are located at the corners of an isoceles triangle.

21. An apparatus for processing a battery case according to claim 20, wherein said groove forming roller and said further roller rotate within a casing, said casing subjected to constant pressure towards said battery case as said battery case is processed.

* * * * *